Aug. 13, 1935.  H. SCHARLAU  2,011,376
BEACON SYSTEM
Filed April 5, 1932   2 Sheets-Sheet 1

INVENTOR
HANS SCHARLAU
BY /H.S.Grover
ATTORNEY

Aug. 13, 1935.  H. SCHARLAU  2,011,376
BEACON SYSTEM
Filed April 5, 1932   2 Sheets-Sheet 2

INVENTOR
HANS SCHARLAU
BY
ATTORNEY

Patented Aug. 13, 1935

2,011,376

UNITED STATES PATENT OFFICE 2,011,376

BEACON SYSTEM

Hans Scharlau, Berlin, Germany, assignor to Telefunken Gesellschaft für Drahtlose Telegraphie m. b. H. Hallesches, Berlin, Germany, a corporation of Germany Application April 5, 1932, Serial No. 603,345
In Germany April 2, 1931

4 Claims. (Cl. 250—11)

For the guiding or piloting of airplanes for making a landing in foggy weather a radio signal system has been suggested in the prior art which for the effecting of the landing in a definite direction uses three kinds of signal transmitters.

The present invention relates to a novel and simplified signalling method and system of the directive type particularly adapted to guide aircraft to a safe landing on landing fields irrespective of weather conditions.

The novel features of my invention have been pointed out with particularity in the claims appended hereto.

My method of signalling and the method of carrying the same out will be best understood by reference to the attached drawings, in which;

Figure 4a shows an indicator which is a modification of the indicator shown in Figure 4; while.

Figure 1:
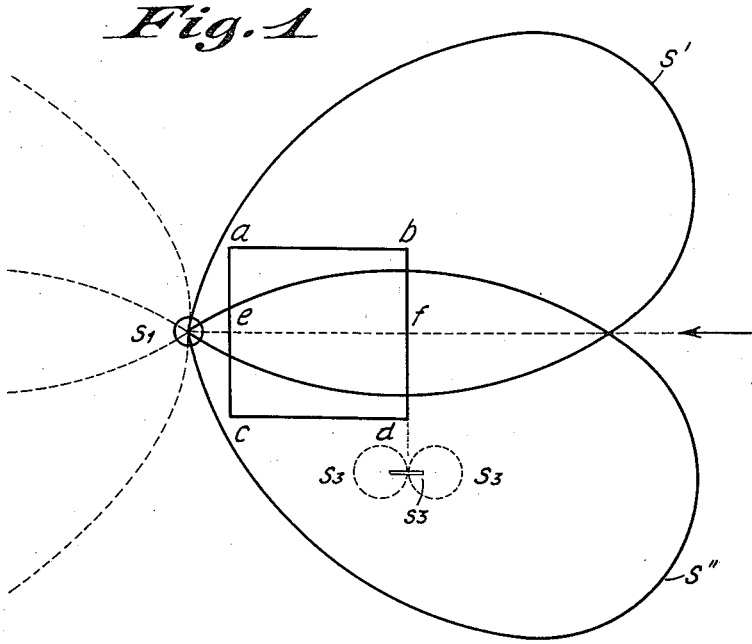
Figures 1 and 2 illustrate landing systems known heretofore in the prior art.

Referring to Fig. 1 (plan view), suppose the quadrangle *abcd* designates the landing field or airport, the signal system governing the direction of landing indicated by the arrow. For guiding or piloting the airplane in the vertical plane passing through the line *ef* there is employed a twin transmitter $s1$ in the rear of the side *ac* of the field. The said twin transmitter sends out two beacons or beams $S'$ and $S''$ on one and the same wave-length, say, 900 meters, but modulated by two dissimilar audio frequencies $n'$ and $n''$, respectively, say 65 and 85 cycles. The radiating means of this transmitter may consist, for instance, of two coil or loop antennæ crossing each other at an angle of 90 degrees, the feeding currents of which loops are supplied from a joint radio frequency source, though being modulated by different audio frequencies. The receiver on the airplane to be thus piloted serving for the reception of the beams $S'$ and $S''$ feeds two indicators which are respectively tuned to audio frequencies $n'$ and $n''$ and being, for instance, of the vibratory type. Upon a lateral deviation of the aircraft out of the vertical plane passing through the line *ef* towards the left-hand side, the vibratory element corresponding to the audio frequency modulation $n''$ of beam $S''$ shows a larger deflection, and upon a deviation toward the right-hand side a smaller deflection than the other vibratory element. Equality in the deflection of the two vibratory elements goes to show that the aircraft is travelling inside the guiding plane.

Figure 2:
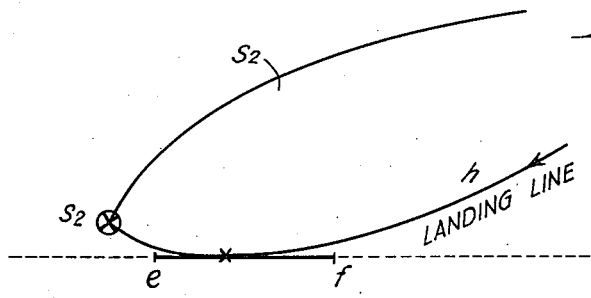

For piloting the airplane along a certain landing line I use another transmitter. This transmitter indicated at $s2$ (see Fig. 2, elevation in vertical guide plane) is also located in the rear of the airport or field along a continuation of the median line *ef*. This transmitter sends out a short-wave beam, say, of a length of 3 meters. The axis of this beam is located in the vertical piloting plane and it constitutes a moderate angle of inclination relatively to the horizontal line *ef*. The geometric locus $h$ of the radiation field of the short-wave transmitter serves as a guide line in the vertical piloting plane. This line has a shape such that it touches the median line *ef* inside the landing field, as shown. The intensity of the field $h$ of the landing guide line has been so chosen that it will produce a definite median deflection of a microammeter mounted on the aircraft and fed from a short-wave receiver thereon which is tuned to the signal transmitter $s2$. The pilot in the attempt to make a landing steers his plane so that the hand of the microammeter takes up a position characteristic of the field intensity $h$. If the deflection is larger or smaller than the said value, this indicates that the plane is located either above or below the correct landing curve $h$, as the case may be.

For controlling or checking up on the instant when the aircraft passes over the entrance side *bd* of the airport or field, there is used a third transmitter $s3$. Its beam has the same frequency as that of the twin transmitter $s1$. This transmitter is modulated by a certain audio frequency $n'''$, say of 1000 cycles per second. Its radiator most suitably consists of a loop whose transversal axis is located inside the vertical plane passing through the liminal line *bd* and intersects the guide line $h$ for landing. The directional characteristic of the radiation given off from this loop is indicated in Fig. 1 by the curve S3. The transversal axis of the loop is the geometric locus of the points of zero reception. The pilot therefore, by the aid of a suitable indicator responsive to the radiation or beam S3 and its modulation $n'''$, such as a headset, is able to ascertain the instant when flying across the entrance line or boundary of the landing field by virtue of the fact that at that point reception from the transmitter sending out beam S3 ceases, for instance, that the modulation sound $n'''$ which had previously been audible disappears and fails to be heard.

It is among the objects of my invention to provide a radio beacon system for use as a guide to an aviation pilot when making a landing under conditions of foggy weather wherein the beacon system itself is simplified and the indicating means carried aboard the aircraft is also simplified.

It is another object of my invention to provide a radio beacon system for making blind landings such that a landing may be made in any one of four different directions according to the direction of the prevailing wind.

It is another object of my invention to provide a system of the class described which does not require unduly costly duplication of the transmitting equipment for producing directional beams oriented in the four principle directions of the compass in order that an airplane may, under any condition of the wind, select a suitable direction for landing against the wind.

In accordance with the present invention a radio beacon system is provided which when followed enables a pilot to make a landing in foggy weather in any one of four directions to be chosen according to the prevalent winds. I provide only four transmitter outfits arranged in a novel manner, while upon the aircraft itself only one receiver for effecting the landing is required, and this one receiver not only suffices for keeping along the necessary line of landing, but also determines the crossing of the entrance boundary line of the flying field.

According to the invention, in order to safely guide an airplane to a landing in a fog, it is necessary to mount outside the boundary lines of the landing field, that is, on the north, south, east and west sides thereof, respectively, four directional transmitters which radiate their beams over the field in southern, northern, western and eastern direction, respectively (oriented in the sense of the local magnetic meridian) on carrier waves that are equal to one another and working with constant (optionally equal) energy, though with four dissimilar modulation frequencies coordinated to the said four transmitter sets.

Figure 3:
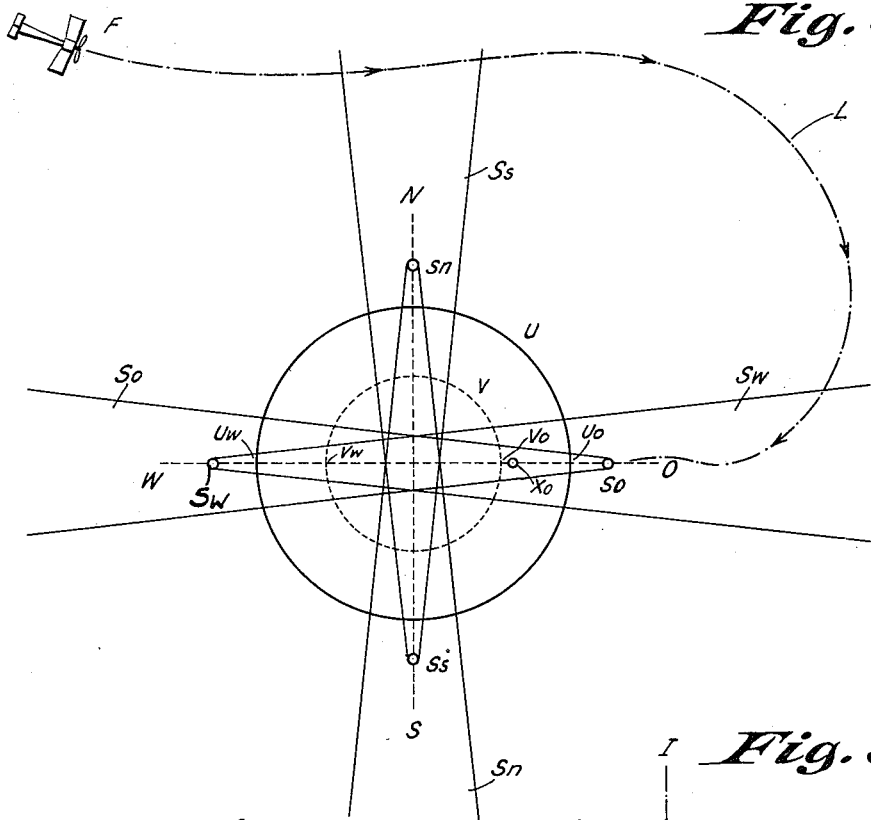
Figures 3 and 3a illustrate a method and signalling system constructed in accordance with the present invention.

Such an arrangement of the landing signal transmitters is schematically illustrated in Fig. 3 in plan. The landing field is here supposed to be circular in shape, and its boundary or contour is indicated by the circle $u$. The directions of the local magnetic meridian or the horizontal at right angles thereto are designated by the lines NS and WO respectively. The beam $Sw$ of the transmitter $sw$ is directed west-east, the beam $So$ of the transmitter $so$ is directed east-west, the beam $Sn$ of the transmitter $sn$ is directed north-south, and the beam $Ss$ of transmitter $ss$ south-north. The radiation energies of these four transmitters are assumed to be alike. The boundaries of these four beams are supposed to consist of the surfaces on which a certain radiation field $h$ exists (see Figure 3a) whereby a certain mean deflection of the indicator of the receiver mounted on the airplane is produced. This particular strength of the field $h$ will hereinafter be called the "landing field intensity", and the lowest (deepest) generatrix of the shell or surface of the beam where this field intensity prevails will be designated as the "landing line".

The maximum angle of divergence in each beam measured in the horizontal plane should not exceed a definite value; at any rate, it should not be over, say, 30 degrees.

Figure 3A:
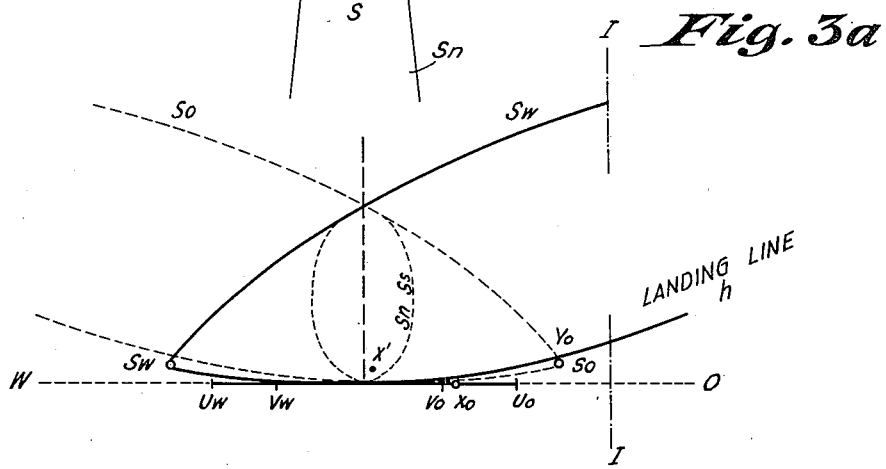

Fig. 3a shows a vertical section of the radiation system through the direction WO, Fig. 3. The section shows for the beam $Sw$ and $So$ the lowest and the highest generatrix of its shell surfaces, and for the beams $Sn$ and $Ss$ the cross-sectional curves of their shells. In order that the airplane during a landing may not readily stray from the lowest $h$-curve to be followed (or landing line) to the highest generatrix, the latter at the point where the landing begins should be sufficiently high above the surface of the earth. In other words, the maximum angle of divergence of the beams in the vertical plane must not be chosen too small, preferably over 30 degrees.

As can be seen from Fig. 3a, points $uw$ and $uo$ denote the western and the eastern limiting points, respectively, of the landing field. The transmitter $sw$ is mounted at a suitable distance west of the boundary $uw$ (this distance as a rule amounting to a fraction of the radius of the landing field, and its radiating means or aerial disposed above ground at a suitable height so that the landing line $h$ defined by its beam $Sw$ for aircraft landing in east-west direction touches the ground approximately at a point $xo$ which for this particular direction of landing lies ahead of the boundary or limit $vo$ of the stretch set aside for the taxiing designated by $vw$ $vo$. The space reserved for the taxiing of landing planes has been bounded by a circle $v$ in Fig. 3. The said point $xo$ is roughly the point for airplane landing in east-west direction where it touches ground. The energy of the transmitters $sw$, $sn$, $so$ and $ss$ may be directed by means of a loop system oriented on a horizontal axis or by means of a deformed parabolic reflector. The latter means is preferred. However any directive system which confines the energy within predetermined limits in a vertical plane as well as a horizontal plane may be used.

In an analogous manner the beams of the other transmitters are disposed and operated.

The four transmissions are distinguishable from one another by their four distinct modulations $zn$ $zo$ $zs$ $zw$, respectively.

Figure 4:
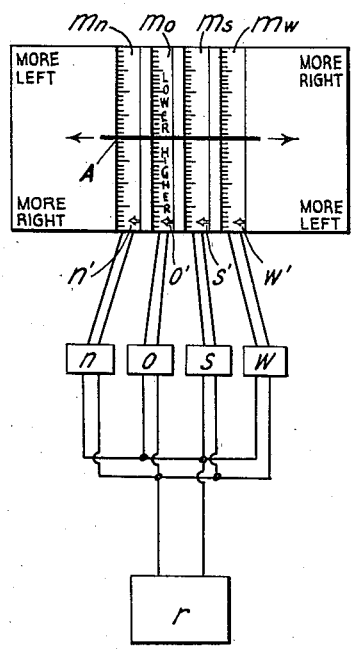
Figure 4 shows a receiver adapted to receive signals sent out in accordance with the present invention.

The determination of different radiations or beams on board an airplane could be accomplished by the aid of acoustic indicator means responsive to tonal frequencies $zn$, $zo$, $zs$, and $zw$, though it is preferable to utilize optical indicators therefor. A very simple embodiment of an optical indicator equipment mounted on an airplane is illustrated in Fig. 4. Referring to the same, $r$ denotes a receiver apparatus responsive to the beams of the landing transmitter and whose output circuit is connected with four different tonal filters $n$, $o$, $s$, and $w$. These filters are tuned to modulating frequencies $zn$, $zo$, $zs$, and $zw$, respectively, and they are adapted in this manner to separate the output energies produced in the receiver $r$ by the four different beams $Sn$, $So$, $Ss$, and $Sw$. Each one of these filters feeds a separate micro-ammeter $mn$, $mo$, $ms$, and $mw$, respectively. The pointers $n'$, $o'$, $s'$, and $w'$ move over suitable scales. The degrees of modulation of the beacon transmitters are so balanced that each pointer or needle of the said micro-ammeter instruments on the airplane comes to be positioned exactly upon the sharp and conspicuously marked median line A as long as the airplane is located inside the shell surface (solid angle) in which prevails the field intensity $h$ of the respective beam.

By the aid of this indicator a landing in foggy weather is accomplishable in the following way: Suppose the pilot of the airplane F (Fig. 3) on approaching the flying field, after having been directed by ordinary radio navigation means and methods to a point close to the field, receives from the ordinary beacon transmitter the order to land, because of the prevailing winds, in the direction from east to west (it having to be noted in this connection that the above ordinary transmitter serving for maintaining communication by radio with the airplane throughout its trip should not be confused with the directive transmitters designed to insure a landing in fog). The pilot thereupon steers his craft roughly along a loop L indicated by the dot-dash line, while simultaneously observing his compass. If while so doing he crosses the beam $Ss$, which would be indicated, for instance, by an audible indicator or by the deflection of the pointer $s'$ of his microammeter $ms$ he will get a rough idea as to his position in reference to the landing field and as a result he gradually veers to the right until he gets into the beam $Sw$. It is then that the pointer or needle $w'$ of micro-ammeter $mw$ responsive to the corresponding beam is caused to deflect, the median mark A being attained when the airplane is located inside the shell of the beam characterized by field intensely $h$. The airplane must now follow the landing line $h$ (Fig. 3a) of the beam $Sw$, the geographic direction being controlled by simultaneous observation of the compass. If the airplane should by chance already be flying upon this landing line then the needle $w'$ will be kept steadily on this mark A. But if the airplane deviates from the landing line upwards or downwards, then the needle $w'$ will rise above, or fall below the mark A, so that the pilot is at once led to effect the necessary correction of the elevator so as to return to the landing curve. In order to avoid confusion the lettering "lower" and "higher" respectively, could be put in the space above and below, respectively, the median line A.

Figure 5:
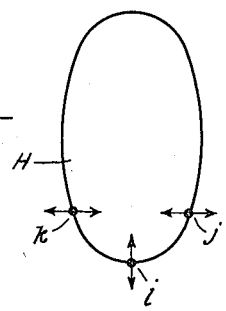
Figure 5 illustrates in a manner a cross section through the energy field produced by one of the transmitters at a point above the landing field and serves to describe the operation of the present invention.

But while the pilot may be on the shell of the landing beam, but not on the landing line, the needle $w'$ will nevertheless be positioned on the mark A; still, in order to appreciate his real position the pilot for the sake of trial must veer somewhat to the left or the right. Referring to Fig. 5 the curve H, for instance, may be the section of the shell of beam $Sw$ with the vertical plane passing through the line I—I of Fig. 3a. If the airplane is located in point $j$ of the section line H and if the pilot, for the sake of checking up on his position, veers for trial to the right-hand side, the needle $w'$ will drop; and this goes to show that the airplane is located on the right of the point $i$ of the landing line so that the craft must be turned to the left in order to get back to that line. In order to relieve the pilot of unnecessary thinking it is desirable to provide the legend "more left" on the upper left-hand and on the lower right-hand spaces of the indicator board.

But if the pilot had veered to the left away from point $j$ then the indicator hand $w'$ would have moved up away from the median line, and this also would demonstrate that point $i$ is left of $j$, and that a veer to the left is required in order to attain the landing curve. The corresponding direction "more left" should therefore be indicated in the upper left space of the indicator board. Inversely the needle of the microammeter will rise or drop, as the case may be, if the pilot for the sake of trial steers his craft out of position $k$ towards the right or the left, so that for those cases the legend "more right" should be supplied upon the upper right and the lower left spaces of the indicator panel.

In fact, such directions relieve the pilot of all unnecessary thinking. For instance, if for the sake of argument the pilot steers his plane to the right and if incidentally or as a consequence the needle of the micro-ammeter rises upwards away from the median line all he has to do is to obey the instruction indicated on the upper right-hand side ("more right") in order to approach the landing curve. Indeed, in this manner, the landing curve $h$ (Fig. 3a) is attained and followed up thereafter while constantly observing the pointer $w'$. Now, when the airplane crosses the transmitter $so$ and thus, at the point $yo$ gets inside the range of its beacon, then also the needle $o'$ indicates a kick, and this goes to show that the aircraft is located at a point close to the limit of the landing field so that the engine can be stopped. The glide extends as far as the touching ground contact point $xo$ and continues in taxiing, terminating somewhere inside the stretch marked $vo$ $vw$. In case the pilot had failed to accurately follow the handing line, but if he flew over it so that the point $xo$ was crossed in flight and so that the airplane inside the taxiing stretch was still a distance $x'$ above the ground he will here get inside the range of the beacons of the other transmitters, a fact evidenced by the corresponding indicators. As a result the pilot is cautioned that touching ground is now too late, in fact, might be dangerous under certain circumstances. Hence, he will give full gas and climb again. The airplane rises and attempts by way of a suitable loop to re-enter the beam $Ss$ from an eastern direction and to proceed correctly down the landing line.

Figure 4A:
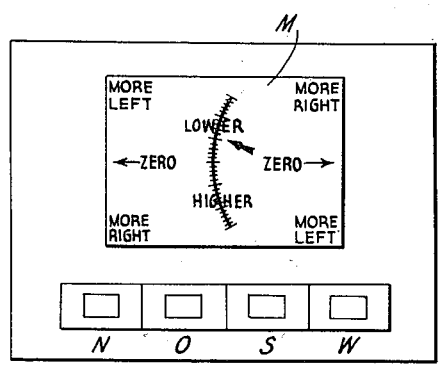

It is to be noted that landing indicator means mounted on board the craft could be varied in quite a number of ways. For instance, as shown in Fig. 4a, instead of the four microammeters as indicated in Fig. 4, only a single micro-ammeter M could be used adapted to indicate the field intensity of the incoming beam independently of its modulation frequency, while for identification of the beam on the basis of its modulation frequency, there is additionally provided a Fram pointer having four vibratory reed indicators N O S W whose natural frequencies are designed to respond to the modulation frequencies $zn$, $zo$, $zs$, and $zw$.

I claim:

1. The method of guiding aircraft to a safe landing on a landing field which includes the steps of producing a plurality of beams of radiant energy of like frequency, directing said beams across said landing field from different sides thereof to provide paths which intersect at substantially the center of said landing field, the axes of said beams forming an angle with the plane of the landing field, the lower edge of said beams reaching said landing field at approximately the center thereof, a cross-section through each of said beams at the center of said landing field being elliptical in shape.

2. A method as recited in claim 1 including the step of impressing on each of said beams of radiant energy a characteristic signal.

3. The method of guiding aircraft equipped with radio receivers to a landing on a landing field from any point on the compass to take advantage of the wind force in landing which includes the steps of, producing a plurality of pairs of radiant energy beams, directing each pair of said beams in opposed directions across said field, said beams diverging outwardly from the producing means and being of substantially equal cross-section area at their point of intersection at the center of said field, the lower boundaries of said beams each following a path which approaches the plane of said landing field and is tangent to said plane at a point on said landing field.

4. A method as recited in claim 3 in which different audio frequency signals are impressed on the energy in each of said beams, said audio frequency signals being characteristic of the direction of the beam on which it is impressed.

HANS SCHARLAU.